(12) United States Patent
Ardes

(10) Patent No.: US 7,712,612 B2
(45) Date of Patent: May 11, 2010

(54) FLUID FILTER FOR AN INTERNAL COMBUSTION ENGINE

(75) Inventor: Wilhelm Ardes, Ascheberg (DE)

(73) Assignee: Hengst GmbH & Co. KG, Muenster (DE)

( * ) Notice: Subject to any disclaimer, the term of this patent is extended or adjusted under 35 U.S.C. 154(b) by 552 days.

(21) Appl. No.: 10/567,539

(22) PCT Filed: Aug. 6, 2004

(86) PCT No.: PCT/EP2004/008840

§ 371 (c)(1),
(2), (4) Date: Jan. 5, 2007

(87) PCT Pub. No.: WO2005/014140

PCT Pub. Date: Feb. 17, 2005

(65) Prior Publication Data

US 2007/0125689 A1 Jun. 7, 2007

(30) Foreign Application Priority Data

Aug. 9, 2003 (DE) .............................. 203 12 318 U

(51) Int. Cl.
*F01M 11/03* (2006.01)
*B01D 35/00* (2006.01)

(52) U.S. Cl. .................. 210/450; 210/440; 210/167.02; 210/171; 123/196 A

(58) Field of Classification Search .................... None
See application file for complete search history.

(56) References Cited

U.S. PATENT DOCUMENTS 3,557,767 A * 1/1971 Green .................... 123/196 A
3,982,520 A * 9/1976 Wheeler .................. 123/196 A
4,406,784 A * 9/1983 Cochran ................. 210/167.05
5,538,626 A * 7/1996 Baumann .................... 210/130
5,922,196 A * 7/1999 Baumann .................... 210/232
6,187,191 B1 * 2/2001 Koivula et al. ............... 210/440
6,554,140 B2 * 4/2003 Steger et al. ................. 210/438
6,746,604 B2 * 6/2004 Jainek ........................ 210/248
2003/0019462 A1 * 1/2003 Baumann et al. ........ 123/196 A

FOREIGN PATENT DOCUMENTS

DE 4242997 C1 4/1994
DE 19701066 A1 7/1998

* cited by examiner

*Primary Examiner*—Krishnan S Menon
*Assistant Examiner*—Madeline Gonzalez
(74) *Attorney, Agent, or Firm*—Greer, Burns & Crain, Ltd

(57) ABSTRACT

The invention relates to a fluid filter including a filter socket with a mounting flange that can, in a sealing manner, be connected to a companion flange on an associated apparatus, wherein at least one fluid duct for supplying fluid to be filtered and one fluid duct for discharging filtered fluid extends through the flange connection, wherein, in the filter socket, at least one section of at least one fluid duct can be closed off against the companion flange by means of a sealing plate designed with at least one through opening that is sealed against the companion flange and is arranged flush with an apparatus-side fluid duct. Therein, it is provided that the surface area of the sealing plate, as seen on the plane of the flange connection, is smaller than the surface area of the mounting flange and that the sealing plate is inserted in the filter socket in a sealing manner and forms a part of the filter socket.

22 Claims, 3 Drawing Sheets

FLUID FILTER FOR AN INTERNAL COMBUSTION ENGINE

BACKGROUND OF THE INVENTION

The present invention relates to a fluid filter, in particular an oil or fuel filter for an internal combustion engine, comprising a filter socket designed with a mounting flange that can, in a sealing manner, be connected to a companion flange on an associated apparatus, in particular on an internal combustion engine, wherein at least one fluid duct for supplying fluid to be filtered from the apparatus to the fluid filter and one fluid duct for discharging filtered fluid from the filter to the apparatus extends through the flange connection, wherein, in the filter socket, at least one section of at least one fluid duct can be closed off against the companion flange by means of a sealing plate designed with at least one through opening that is sealed against the companion flange and is arranged flush with an apparatus-side fluid duct.

A fluid filter of the aforementioned type has already been disclosed in DE 42 42 997 C1. In this fluid filter, which is serving as an oil filter, a sealing plate in the form of an essentially continuous plate is arranged between the mounting flange of an internal combustion engine and the mounting flange of the filter socket of the fluid filter, the sealing plate being provided with two breakthroughs for passing the fluid through the plate. Herein, the outer contour of the sealing plate corresponds with the outer contours of the mounting flanges of the internal combustion engine and the filter socket. In this known fluid filter, it is furthermore preferably provided that the sealing plate, on its side facing the mounting flange of the internal combustion engine, carries sealing webs which correspond with the sealing webs of the mounting flange of the internal combustion engine and that the sealing plate, on its side facing the fluid filter socket, carries sealing webs which correspond with the sealing webs of the fluid filter socket. The sealing plate serves to render a connection diagram of the mounting flange on the side of the internal combustion engine suitable for connection of the fluid filter, the connection diagram being predetermined by the manufacturer of the internal combustion engine and, as a rule, failing to correspond with the ideal connection diagram for the fluid filter.

In this known fluid filter, it is considered to be a disadvantage that the sealing plate requires additional free space, because the fluid filter, caused by the intermediately installed sealing plate, moves away from the internal combustion engine by a measure corresponding to the thickness of the sealing plate. In some applications, this might cause problems in connection with the space available, in particular in the engine compartment of modern motor vehicles. Furthermore, the sealing plate is a component which requires variably extending sealing webs to be installed on either of its sides, thus making its manufacture rather difficult. In addition, the sealing plate must be supplied and mounted as a separate component, causing additional efforts and additional costs. If made of metal, as has, to date, been the case for reasons of stability, the sealing plate also contributes noticeably to a high total weight of the fluid filter including the sealing plate, this being inconsistent with the aim of saving as much weight as possible.

SUMMARY OF THE INVENTION

For that reason, the present invention aims at creating a fluid filter of the aforementioned type, which obviates the drawbacks disclosed and permits to achieve, in particular, a more compact construction, a lower weight and the ability of being manufactured more easily and, thus, more cost-effectively.

This problem is solved by the invention by means of a fluid filter of the aforementioned type, characterized in that the surface area of the sealing plate, as seen on the plane of the flange connection, is smaller than the surface area of the mounting flange and that the sealing plate is inserted in the filter socket in a sealing manner and forms a part of the filter socket.

The fluid filter according to the invention is to advantage in that it only requires a sealing plate the surface area of which is reduced and which is, in addition, incorporated in the filter socket. Moreover, the sealing plate must be dimensioned only as required by the connection diagram, whereby the surface area of the sealing plate is limited to a minimum size. At the same time, the sealing plate neither increases the physical size of the fluid filter nor the free space required therefor, and the sealing plate contributes to the total weight of the fluid filter including sealing plate to a minor degree only. As a result, it is, to advantage, possible to save weight in addition to providing the more compact construction. At the same time, the fluid filter according to the invention has the advantage that the filter socket of the fluid filter is subjected to smaller pressure forces which, caused by the existing hydraulic pressure, develop in the direction of the perpendicular to the plane of the flange connection. For that reason, the fluid filter according to the invention manages with lighter-weight mounting means and with an altogether lighter-weight construction with thinner wall thicknesses and/or with a material of less strength, this permitting further cost saving.

In its minimum scope, the flange connection comprises two fluid ducts one of which, as a first fluid duct, delivers fluid from the associated apparatus to the fluid filter and the other, as a second duct, delivers fluid from the fluid filter to the associated apparatus. According to the invention, it is, however, preferably provided that, as a third fluid duct, an unpressurized drain duct for draining the fluid filter on replacement of the filter element extends through the flange connection. This design of the fluid filter allows an embodiment with a, preferably, automatic drainage of the filter housing upon replacement of the filter element. At the same time, the force acting on the filter socket is not increased by the hydraulic pressure during operation of the associated apparatus, owing to the incorporation of the additional fluid duct.

In a further development of the invention, it is proposed that two or three separate sealing plates are provided, wherein one sealing plate is allocated to each of one or two of the fluid ducts extending through the flange connection. As compared with one single large-size sealing plate, the utilization of a multitude of sealing plates may facilitate inserting and sealing of the individual sealing plates in the fluid filter, with the result that this embodiment of the fluid filter allows the achievement of a higher reliability with regard to the tightness of the sealing plates inserted in the socket.

In order to attain a particularly low weight of the fluid filter, an embodiment of the invention provides that the filter socket and the sealing plate(s) are plastic parts and that the sealing plate(s) is/are connected by welding or gluing to the remaining filter socket. The utilization of plastic as a material for the filter socket and the sealing plate(s) furthermore allows, to advantage, a welded or glued connection between these parts, ensuring both the desired tightness and the firm mechanical hold.

In a further embodiment of the fluid filter just described, it is proposed that the sealing plate(s), at its/their through opening(s), is/are (each) provided with a pipe socket with a radially acting sealing ring, wherein the pipe socket projects in the direction of the associated apparatus and can be inserted in the machine-side fluid duct. The pipe socket that can be inserted in the apparatus-side fluid duct and is provided with a radially acting sealing ring is to advantage in that the pressure forces having to be absorbed by the filter socket are essentially lower, this permitting the filter socket to be made of a less stable material, e.g., of the aforementioned plastic, without this involving a higher leakage risk.

An alternative embodiment of the fluid filter provides that the filter socket and the sealing plate(s) are parts made of plastic or of metal and that the sealing plate(s) is/are inserted in the remaining filter socket and fixed therein, with a peripheral, radially or axially acting sealing ring being placed intermediate the filter socket and (each of) the sealing plate(s). In this embodiment, the sealing plate(s) is/are inserted in the filter socket by means of a sealing ring, with the result that, here, it is possible to replace a sealing plate if necessary, for example, if it is damaged.

In order to prevent high costs for special seals, the radially acting sealing rings provided on the pipe sockets and/or the sealing plates are, preferably, standard O-rings.

Alternatively, axially acting sealing means can also be used in the region of the flange connection. To this end, the invention proposes that the sealing plate(s) is/are, at its/their through opening(s), (each) designed with an axially acting sealing ring and projecting in the direction of the associated apparatus and surrounding the sealing plate(s). In this embodiment of the fluid filter, the sealing plate(s) can be designed in a simpler manner, because it/they do not require any insertable and projecting pipe socket. On the other hand, however, components are required that have a somewhat increased strength, so that the increased pressure forces occurring because of the axial sealing effect and acting in the direction of the perpendicular to the flange plane can be absorbed without causing the risk of leakages.

A further embodiment of the fluid filter according to the invention proposes that a peripheral axially acting seal is provided in parallel to the outer contour of the mounting flange and arranged therein, the seal enclosing the through opening(s). This peripheral seal serves as a protection against egress of fluid into the environment in the event of a leak in the region of the seal(s) sealing the through opening or through openings.

A further embodiment provides that the peripheral seal described above simultaneously seals the fluid duct(s) in the flange connection that is/are not extending through the through opening(s) in the sealing plate. In this embodiment, the surrounding seal assumes a second function, this promoting a simple construction of the fluid filter in the latter's flange region.

An alternative to the embodiment of the fluid filter described above proposes that the fluid duct(s) not extending through the through opening(s) in the sealing plate or sealing plates is/are (each) separately sealed by its/their own sealing means and that the peripheral seal encloses the fluid duct(s) in the flange connection not extending through the through opening(s) in the sealing plate. Although it requires a higher number of seals, this embodiment of the fluid filter provides an increased protection against fluid leaks into the environment.

In order to achieve a good and permanent sealing effect in the region of the axial seals, it is further proposed that the axially acting seals are sectional seals.

As has already been mentioned above, the filter socket or a filter housing enveloping the socket as well as the sealing plate can, optionally, be made of plastic or metal. For a plastic design, it is preferably provided that the plastic is polyamide and that the filter socket or a filter housing enveloping the socket and the sealing plate(s) are produced as injection-molded parts. Polyamide is a plastic material having a mechanical, thermal and chemical stability that is high enough for numerous applications, wherein a low weight and relatively low manufacturing costs are achieved at the same time.

For the fluid filter made of metal component parts, it is alternatively and preferably provided that the metal is aluminum or magnesium and that the filter socket or a filter housing enveloping the socket and the sealing plate(s) are produced as die castings. The utilization of aluminum or magnesium allows the achievement of higher mechanical and thermal stabilities, with the result that this embodiment of the fluid filter is suitable for applications causing the occurrence of particularly high hydraulic pressures and/or particularly high fluid temperatures.

BRIEF DESCRIPTION OF THE DRAWING

Executive examples of the invention will be illustrated below by means of a drawing, wherein.

DETAILED DESCRIPTION OF THE PREFERRED EMBODIMENT

Figure 1:
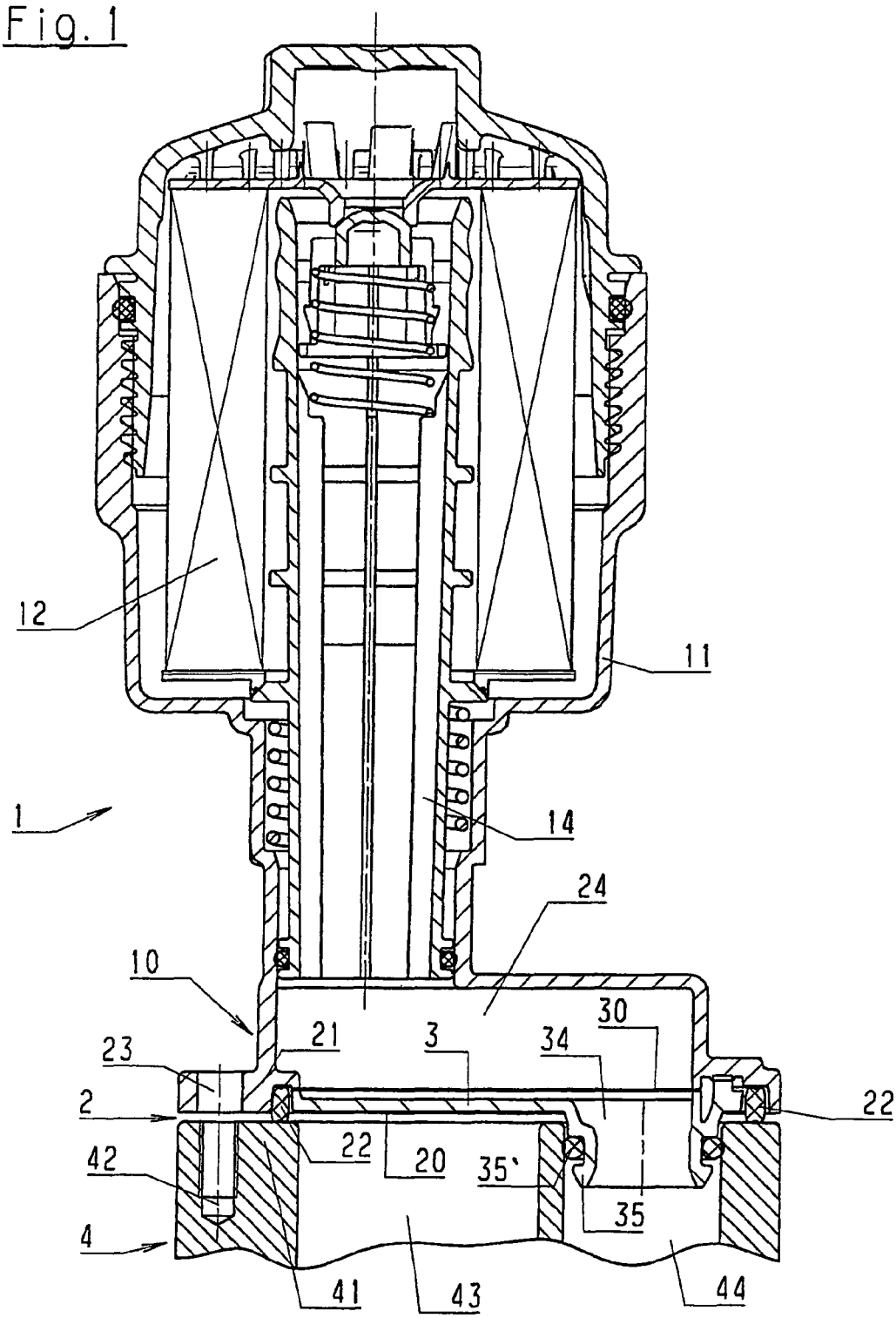
FIG. 1 is a longitudinal sectional view of a fluid filter in a first embodiment, the fluid filter being designed as an oil filter.

As shown in FIG. 1 of the drawing, the represented executive example of an oil filter 1 comprises a filter housing 11, wherein a filter socket 10 is designed in one piece with the filter housing 11. The filter housing 11 with filter socket 10 is, for example, an injection-molded part made of plastic or a die casting made of light metal.

A filter element 12 which, here, serves for filtering the lubricating oil of an internal combustion engine 4, only a small part of which is shown here, is arranged in the filter housing 11 in the usual manner.

A flange connection 2 comprising a mounting flange 21 of the oil filter 1 and a companion flange 41 of the internal combustion engine 4 is used to connect the oil filter 1 to the internal combustion engine 4. Therein, the mounting flanges 21, 41 abut against one another in a sealing manner on a plane 20 of the flange connection 2.

In the sectional view according to FIG. 1, an oil duct section 24 of the oil duct 14 can be seen in the region of the filter socket 10, wherein the duct serves to return the lubricating oil, after it has been filtered, from the oil filter 1 to the internal combustion engine 4.

A duct intended to supply lubricating oil to be filtered from the internal combustion engine 4 to the oil filter 1 is arranged above the cutting plane in front of the parts of the oil filter 1 that are visible in FIG. 1; for that reason, the duct cannot be seen in FIG. 1.

Initially, the filter socket 10 is designed open towards the companion flange 41 and can, thus, be demolded without any difficulties in an injection-molding production process. Thereafter, the region of the filter socket 10 that is initially open towards the companion flange 41 is, in the region of the oil duct section 24, tightly closed by a sealing plate 3, with the exception of a through opening 34. To this end, the sealing plate 3 is inserted in the region of the filter socket 10 that is located towards the companion flange 41 and in the oil duct section 24 extending therein and is connected to the remaining filter socket 10 in a continuously tight manner, in this case by means of a weld seam 30.

Here, the through opening 34 in the sealing plate 3 is designed in the form of a pipe socket 35 projecting towards the internal combustion engine 4 and provided with a groove extending along the outer perimeter and with an O-ring 35' as a radially acting sealing means. When the oil filter 1 and the internal combustion engine 4 are assembled, the pipe socket 35 projects into an oil duct 44 in the companion flange 41 of the internal combustion engine 4 and is sealed against the walls of the oil duct 44 by the O-ring 35' in an impermeable manner.

Inside the flange connection 2, at least one further oil duct is connected, wherein oil can be supplied from the internal combustion engine 4 to the oil filter 1 through the further oil duct and wherein the connection is arranged above the cutting plane of FIG. 1 and can, therefore, not be seen.

In the executive example shown in FIG. 1, the flange connection 2 is, in addition, sealed by a continuous sectional seal 22 arranged in a radially outer region of the flange connection 2 and forming an axially acting sealing means. The seal 22 forms a protection in the event of possible leakages in the region of the O-ring 35'.

To the left of the oil duct 44, a cavity 43 is arranged in the region of the companion flange 41 of the internal combustion engine 4, wherein this cavity 43 may, for example, be an unpressurized duct that is connected to the oil pan of the internal combustion engine 4. In the event of a leakage of the O-ring 35', the cavity or duct 43 takes up egressing oil, preventing this oil from flowing into the environment.

A multitude of screws which can be screwed through screw holes 23 of the filter socket 10 and into threaded holes 42 in the companion flange 41 of the internal combustion engine 4 are used to mechanically connect the filter socket 10 to the internal combustion engine 4.

Figure 2:
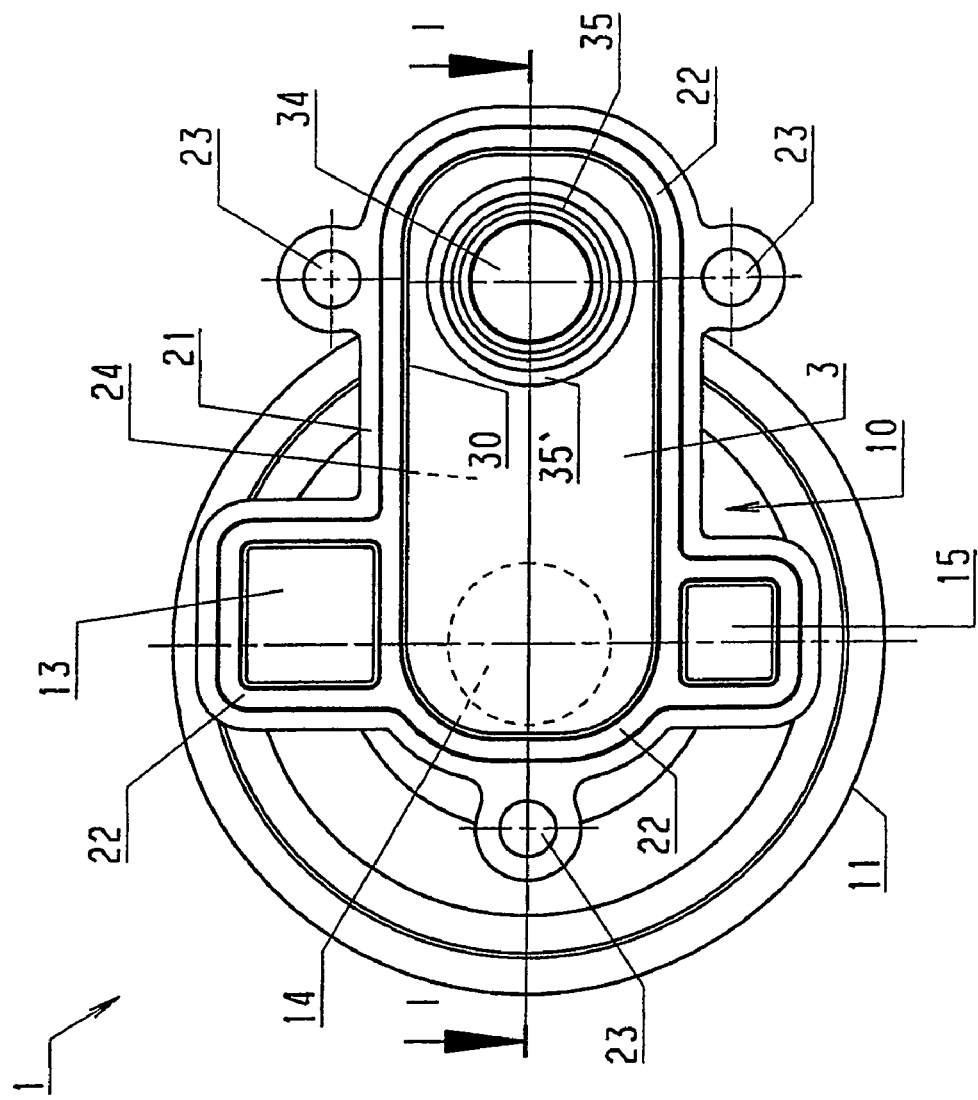
FIG. 2 shows the oil filter of FIG. 1 in a bottom view of the mounting flange thereof.

FIG. 2 shows the oil filter 1 of FIG. 1 in a bottom view of the mounting flange 21 thereof.

The filter housing 11 is shown in the background of FIG. 2; the filter socket 10 is shown in the foreground, facing the viewer. The sealing plate 3 which is inserted in the filter socket 10 in a sealing manner and is tightly connected to the remaining filter socket 10 along the weld seam 30 extends from the center of the filter socket 10 to the right. The through opening 34 in the form of a pipe socket 35 projecting towards the viewer and provided, at its outer perimeter, with a radially sealing O-ring 35' is arranged to the right in the sealing plate 3.

Hidden by the sealing plate 3, the oil duct 14 is arranged in the center of the filter socket 10 and the filter housing 11 wherein, here, this oil duct 14, which is only represented by a broken line, supplies filtered oil from the oil filter 1 into the oil duct section 24 likewise hidden by the sealing plate 3 and, from there, through the through opening 34 to the internal combustion engine 4 which is not visible here.

A second oil duct 13 which can likewise be connected to the internal combustion engine in the mounting flange 21 and serves to supply lubricating oil from the internal combustion engine to the oil filter 1 is provided as a further duct above the sealing plate 3.

Furthermore, the executive example according to FIG. 1 and FIG. 2 comprises a third oil duct 15 serving as an unpressurized drain duct for discharging the filter housing 11 upon replacement of the filter element. The drain duct 15 is also arranged in the mounting flange 21 and is, therein, connected to an appropriately positioned duct of the internal combustion engine 4, this duct preferably running as an unpressurized duct to the oil pan of the internal combustion engine.

To its left side as well as to its upper and lower right, the filter socket 10 is provided with a total of three screw holes 23 which serve to mechanically connect the oil filter 1 to the internal combustion engine by means of screws that are not shown here.

Furthermore, the peripheral sectional seal 22 which is designed as a one-piece seal extends around the mounting flange 21, including the oil ducts 13 and 15. The seal 22 operates as an axially acting sealing means and is inserted in a groove formed in the mounting flange 21, with the depth of this groove being less than the height of the seal 22 in its relaxed state.

FIG. 2 illustrates particularly vividly that, in case of the oil filter 1, any offset between the oil duct 14 and the through opening 34 to the companion flange of the internal combustion engine can be bridged by means of the simple sealing plate 3 which represents an inexpensive component, this allowing easy adaptation of the position of the oil ducts inside the mounting flange 21 of the filter socket 10 to a connection diagram predetermined on the side of the internal combustion engine.

Furthermore, the sealing plate 3 ensures that the oil pressure acting in the oil duct section 24 is not able to generate, inside the flange connection 2, high pressures acting on the filter socket 10 in a direction perpendicular to the plane 20 of the flange connection 2, wherein such forces would subject the flange connection 2 to high mechanical stress.

In the executive example of the oil filter 1 according to FIG. 1 and FIG. 2, the sealing plate 3, with the exception of the pipe socket 35, is a flat component that is arranged in the filter socket 10 in parallel to the plane 20 of the flange connection 2.

Figure 3:
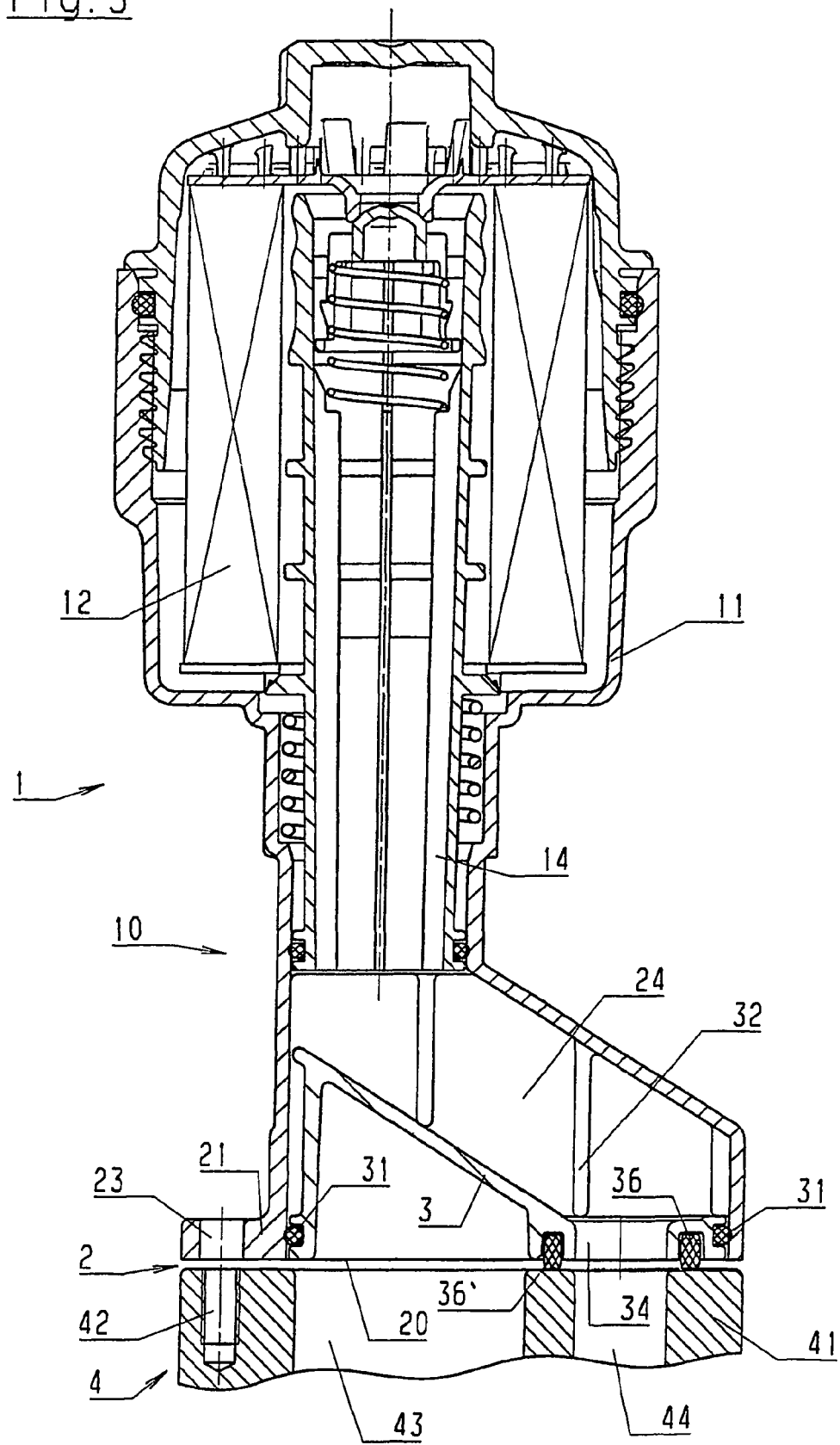
FIG. 3 is a longitudinal sectional view of the oil filter in a second embodiment.

The second executive example of the oil filter 1 shown in FIG. 3 possesses a filter socket 10 with a geometrically different design and, suitable therewith, a sealing plate 3 that likewise has a geometrically different design.

In the executive example according to FIG. 3, the filter housing 11 with the filter element 12 corresponds with the embodiment according to FIG. 1.

In the example according to FIG. 3, the lubricating oil that has been filtered by the filter element 12 in the filter housing 11 is also supplied from the filter element 12 through the central oil duct 14 and, initially, to the filter socket 10. Here as well, the filter socket 10 accommodates an oil duct section 24 that is, initially, open towards the mounting flange 21. The oil duct section 24 is, here as well, tightly closed by the sealing plate 3, with the exception of a through opening 34 provided therein. Here as well, the sealing plate 3 is, in a sealing manner, inserted in the filter socket 10 and in the oil duct section 24 extending therein.

In contrast to the executive example according to FIG. 1 and FIG. 2, the sealing plate 3 shown in the example according to FIG. 3 is inserted in the oil duct section 24 in a sealing manner, with a radially outer peripheral seal 31 being placed therebetween.

Adjusted to the inclined course of the wall provided to the upper right of the filter socket 10 and bordering the oil duct section 24 at the latter's top, the sealing plate 3 extends approximately parallel thereto, likewise in an inclined alignment. In this manner, it is possible to achieve favorable flow conditions with flow deflections that are less sharp than in the executive example according to FIG. 1 and FIG. 2.

Congruent with the oil duct 44, the through opening 34 in the sealing plate 3 is arranged in the companion flange 41 of the internal combustion engine 4. The lubricating oil that has been filtered in the oil filter 1 is supplied through the oil duct 44 and to the lubricating points of the internal combustion engine.

Here as well, a cavity or unpressurized duct 43 which is separated from the oil duct section 24 in the filter socket 10 by the sealing plate 3 is arranged in the internal combustion engine 4 to the left of the oil duct 44.

An axially acting sealing ring 36' that prevents lubricating oil from flowing out into the environment in the region of the flange connection 2 is arranged in a groove 36 around the through opening 34.

To establish a mechanical connection between the oil filter 1 and the internal combustion engine 4, a multitude of screw holes 23 are, here as well, provided in the filter socket 10 and a multitude of threaded holes 42 are provided in the internal combustion engine 4, with FIG. 3 showing only one of the screw holes and one of the threaded holes.

As has been illustrated with regard to the example according to FIG. 3, the sealing plate 3 is inserted in the oil duct section 24 with the sealing ring 31 being placed therebetween. A multitude of ribs 32 are provided in the oil duct section 24 to allow exact positioning and supporting of the sealing plate 3, with the sealing plate 3 being supported at its top by the lower ends of the ribs 32.

According to FIG. 3, the sealing plate 3 is supported in an opposite direction, i.e. at its bottom, by the companion flange 41 of the internal combustion engine 4, while the filter 1 is in its attached state; as a result, the sealing plate 3, in its assembled state, is and remains reliably and exactly positioned despite the lack of a permanent connection, such as a welded connection.

In the executive example of the oil filter 1 according to FIG. 3, any offset between the position of the oil duct 14 in the oil filter 1 and the position of the oil duct 44 in the internal combustion engine 4 is also bridged by means of the sealing plate 3, wherein the sealing plate 3 is a simple and inexpensive component. If necessary, it is also possible to bridge an offset between the oil duct 13 and the associated oil duct in the internal combustion engine 4 and/or an offset between the drain duct 15 and the associated oil duct in the internal combustion engine 4 by means of a single sealing plate 3 appropriately increased in size or by means of a multitude of individual smaller sealing plates 3, inasmuch as this is required due to the construction.

As is apparent from the foregoing specification, the invention is susceptible of being embodied with various alterations and modifications which may differ particularly from those that have been described in the preceding specification and description. It should be understood that we wish to embody within the scope of the patent warranted hereon all such modifications as reasonably and properly come within the scope of our contribution to the art.

The invention claimed is:

1. A fluid filter used with an associated apparatus having a companion mounting flange, comprising:
    a filter housing having an internal space for receiving a filter element,
    a filter socket located at one end of the filter housing and having a mounting flange that can, in a sealing manner, be connected to the companion flange on the associated apparatus to form a flange connection,
    at least one first fluid duct in the filter housing for supplying fluid to be filtered from the apparatus to the fluid filter and one second fluid duct in the filter housing for discharging filtered fluid from the filter to the apparatus extending through said flange connection,
    the filter socket having an enlarged opening in the mounting flange leading to the first and second fluid ducts,
    a sealing plate formed separately from said filter socket and configured to be inserted into the enlarged opening in the filter socket mounting flange and arranged to close off at least one section of at least one of said fluid ducts, said sealing plate having at least one through opening that is sealed directly against the companion flange and being arranged flush with an apparatus-side fluid duct such that fluid flowing through said through opening is led immediately, directly and exclusively into the apparatus-side fluid duct,
    a surface area of said sealing plate, as seen on a plane of said flange connection, being smaller than a surface area of said mounting flange, and
    said sealing plate being inserted in said filter socket in a sealing manner by means of a separate sealing member extending around a perimeter of said sealing plate, such that said sealing plate forms a part of said filter socket.

2. A fluid filter according to claim 1, wherein said fluid filter comprises an oil or fuel filter for an internal combustion engine.

3. A fluid filter according to claim 1, wherein at least two separate sealing plates are provided, one sealing plate being allocated to each of said at least two fluid ducts extending through said flange connection.

4. A fluid filter according to claim 1, wherein, as a third fluid duct, an unpressurized drain duct arranged to drain the fluid filter upon replacement of a filter element of the filter extends through said flange connection.

5. A fluid filter according to claim 4, wherein at least three separate sealing plates are provided, one sealing plate being allocated to each of said at least three fluid ducts extending through said flange connection.

6. A fluid filter according to claim 1, wherein said filter socket and said sealing plate are formed as plastic parts and said sealing plate is one of welded and glued to said filter socket.

7. A fluid filter according to claim 6, wherein said sealing plate, at its through opening, is provided with a pipe socket having a radially acting sealing ring, wherein said pipe socket projects towards the companion flange and can be inserted in an apparatus-side fluid duct.

8. A fluid filter according to claim 1, wherein said filter socket and said sealing plate are formed as parts made of one of plastic and metal, and a sealing ring is inserted between said filter socket and said sealing plate.

9. A fluid filter according to claim 8, wherein said sealing ring acts radially.

10. A fluid filter according to claim 9, wherein said radially acting sealing rings are standard O-rings.

11. A fluid filter according to claim 8, wherein said sealing ring acts axially.

12. A fluid filter according to claim 8, wherein said sealing plate, at its through opening, is provided with an axially acting sealing ring surrounding said through opening and projecting in a direction of the companion flange.

13. A fluid filter according to claim 1, wherein a peripheral axially acting seal is provided in parallel to an outer contour of said mounting flange and arranged therein, said seal enclosing said through opening.

14. A fluid filter according to claim 13, wherein said seal simultaneously seals the fluid duct in the flange connection that is not extending through said through opening in said sealing plate.

15. A fluid filter according to claim 13, wherein the fluid duct not extending through said through opening in said sealing plate is separately sealed by its own sealing means and said seal encloses the fluid duct in said flange connection not extending through said through opening in said sealing plate.

16. A fluid filter according to claim 12, wherein said axially acting seal is a sectional seal.

17. A fluid filter according to claim 6, wherein said plastic is polyamide and said filter socket and said sealing plate are produced as injection-molded parts.

18. A fluid filter according to claim 8, wherein said metal is one of aluminum and magnesium and said filter socket and said sealing plate are produced as die casting parts.

19. An oil or fuel filter for an internal combustion engine, wherein the engine has a companion mounting flange, said filter comprising:
- a filter housing having an internal space for receiving a filter element,
- a filter socket located at one end of the filter housing with a mounting flange that can, in a sealing manner, be connected to the companion flange to form a flange connection,
- at least one first fluid duct in the filter housing for supplying fluid to be filtered from the engine to the fluid filter, one second fluid duct in the filter housing for discharging filtered fluid from the filter to the engine, and a third fluid duct in the filter housing, being an unpressurized drain duct for draining the fluid filter upon replacement of the filter element, extending through said flange connection,
- the filter socket having an enlarged opening in the mounting flange leading to the first, second and third fluid ducts,
- a sealing plate formed separately from said filter socket and configured to be inserted into the enlarged opening in the filter socket mounting flange and arranged to close off at least one section of at least one of said fluid ducts, said sealing plate having at least one through opening that is sealed directly against the companion flange and being arranged flush with an engine-side fluid duct such that fluid flowing through said through opening is led immediately, directly and exclusively into the engine-side fluid duct,
- a surface area of said sealing plate, as seen on a plane of said flange connection, being smaller than a surface area of said mounting flange, and
- said sealing plate being inserted in said filter socket in a sealing manner by means of a separate seal member extending around a perimeter of said sealing plate, such that said sealing plate forms a part of said filter socket.

20. A fluid filter according to claim 19, wherein three separate sealing plates are provided, wherein one sealing plate being allocated to said at least three fluid ducts extending through said flange connection.

21. A fluid filter according to claim 19, wherein said filter socket and said sealing plate are parts made of plastic or of metal and said sealing plates are inserted into said filter socket and fixed therein, with one of a peripheral, radially and axially acting sealing ring being placed intermediate the filter socket and each of said sealing plates.

22. An oil or fuel filter according to claim 19, wherein said sealing plate has only one opening for communicating with only one of said first, second and third fluid ducts, and said seal member includes openings for the remaining two of said first, second and third fluid ducts, which extend through said flange connection laterally offset from and outside a perimeter of said sealing plate.

* * * * *